United States Patent
Edwards

(10) Patent No.: US 10,443,502 B2
(45) Date of Patent: Oct. 15, 2019

(54) ROTOR DAMPER

(71) Applicant: ROLLS-ROYCE plc, London (GB)

(72) Inventor: Garry Mark Edwards, Clevedon (GB)

(73) Assignee: ROLLS-ROYCE plc, London (GB)

(*) Notice: Subject to any disclaimer, the term of this patent is extended or adjusted under 35 U.S.C. 154(b) by 767 days.

(21) Appl. No.: 15/079,629

(22) Filed: Mar. 24, 2016

(65) Prior Publication Data

US 2016/0298546 A1    Oct. 13, 2016

(30) Foreign Application Priority Data

Apr. 13, 2015 (GB) .................................. 1506196.3

(51) Int. Cl.
| | |
|---|---|
| *F02C 7/20* | (2006.01) |
| *F16F 15/14* | (2006.01) |
| *F01D 5/16* | (2006.01) |
| *F01D 5/26* | (2006.01) |
| *F01D 5/34* | (2006.01) |

(52) U.S. Cl.
CPC ............... *F02C 7/20* (2013.01); *F01D 5/16* (2013.01); *F01D 5/26* (2013.01); *F01D 5/34* (2013.01); *F16F 15/14* (2013.01); *F05D 2230/60* (2013.01); *F05D 2240/80* (2013.01); *F05D 2260/37* (2013.01); *F05D 2260/96* (2013.01)

(58) Field of Classification Search
CPC ..... F01D 5/10; F01D 5/16; F01D 5/26; F01D 5/34; F01D 5/027; F01D 25/04; F02C 7/20; F05D 2260/96; F05D 2240/80; F05D 2260/37; F05D 2230/60; F16F 15/14

See application file for complete search history.

(56) References Cited

U.S. PATENT DOCUMENTS

| | | | |
|---|---|---|---|
| 4,361,213 A | * | 11/1982 | Landis, Jr. ............. F01D 11/02 188/378 |
| 5,429,477 A | | 7/1995 | Sikorski et al. |
| 5,562,419 A | | 10/1996 | Crall et al. |
| 5,733,103 A | | 3/1998 | Wallace et al. |

(Continued)

FOREIGN PATENT DOCUMENTS

| | | |
|---|---|---|
| EP | 1074762 A2 | 2/2001 |
| EP | 2604793 A2 | 6/2013 |

(Continued)

OTHER PUBLICATIONS

Jun. 20, 2016 Search Report issued in British Patent Application No. 1604913.2.

(Continued)

*Primary Examiner* — Jason D Shanske
*Assistant Examiner* — Julian B Getachew
(74) *Attorney, Agent, or Firm* — Oliff PLC

(57) ABSTRACT

A rotor stage of a gas turbine engine includes a platform from which rotor blades extend. The platform is provided with a circumferentially extending damper ring, the damper ring having an engagement surface that engages with the platform. The damper ring provides damping through slip between the engagement surface and the platform. The damper ring has a hoop stress that results in a load being provided to the platform from the engagement surface. The load can be optimized in order to provide improved damping.

11 Claims, 5 Drawing Sheets

(56) References Cited

U.S. PATENT DOCUMENTS

| | | | |
|---|---|---|---|
| 5,853,285 A * | 12/1998 | Miller | F01D 5/08 |
| | | | 416/96 R |
| 6,375,428 B1 | 4/2002 | Stangeland et al. | |
| 6,471,484 B1 | 10/2002 | Crall | |
| 6,494,679 B1 | 12/2002 | Gadre et al. | |
| 7,527,476 B2 | 5/2009 | Butt et al. | |
| 7,758,311 B2 | 7/2010 | Loehle et al. | |
| 8,333,563 B2 | 12/2012 | Razzell | |
| 2009/0214347 A1 * | 8/2009 | Cloarec | F01D 5/10 |
| | | | 416/204 A |
| 2010/0021305 A1 * | 1/2010 | Martensson | F01D 5/10 |
| | | | 416/186 R |
| 2011/0268561 A1 | 11/2011 | Blanchard et al. | |
| 2012/0057988 A1 | 3/2012 | Stiehler | |
| 2013/0004313 A1 * | 1/2013 | El-Aini | F01D 5/10 |
| | | | 416/134 R |

FOREIGN PATENT DOCUMENTS

| | | |
|---|---|---|
| FR | 2888876 A1 | 1/2007 |
| GB | 570 665 A | 4/1952 |
| GB | 2 255 138 A | 10/1992 |
| JP | H05-30813 A | 2/1993 |
| JP | 2009-197649 A | 9/2009 |
| JP | 2014-114716 A | 6/2014 |

OTHER PUBLICATIONS

Oct. 14, 2015 Search Report issued in British Patent Application No. 1506196.3.

* cited by examiner

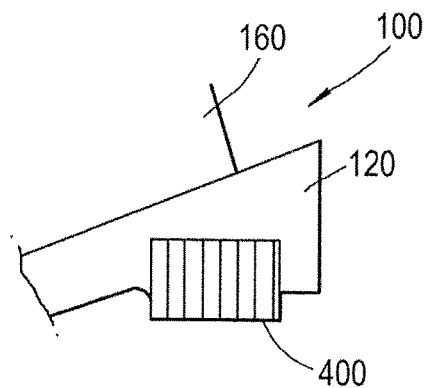
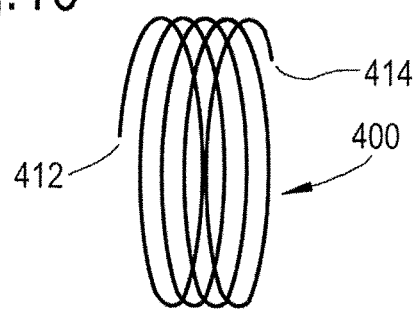

ROTOR DAMPER

CROSS-REFERENCE TO RELATED APPLICATIONS

This application is based upon and claims the benefit of priority from British Patent Application Number 1506196.3 filed 13 Apr. 2015, the entire contents of which are incorporated by reference.

BACKGROUND

1. Field of the Disclosure

The present disclosure concerns a damper for a rotating part of a gas turbine engine.

2. Description of the Related Art

A gas turbine engine comprises various stages of rotor blades which rotate in use. Typically, a gas turbine engine would have at least one compressor rotor stage, and at least one turbine rotor stage.

There are a number of ways in which the blades of a rotor stage may be attached to the engine. Generally, the blades attach to a rotating component, such as a disc, that is linked to a rotating shaft. Conventionally, blades have been inserted and locked into slots formed in such discs.

Integral bladed disc rotors, also referred to as blisks (or bliscs), have also been proposed. Such blisks may be, for example, machined from a solid component, or may be manufactured by friction welding (for example linear friction welding) of the blades to the rim of the disc rotor.

Blisks have a number of advantages when compared with more traditional bladed disc rotor assemblies. For example, blisks are generally lighter than equivalent bladed disc assemblies in which the blades are inserted and locked into slots in the disc because traditional blade to disc mounting features, such as dovetail rim slots, blade roots, and locking features are no longer required. Blisks are therefore increasingly used in modern gas turbine engines, for example as part of the compressor section (including the fan of a turbofan engine).

Typically blisks are designed where possible to avoid vibration responses from, for example, resonance and flutter, which may be distortion driven. However, blisks lack inherent damping when compared to conventional bladed disc assemblies and resonances and flutter cannot always be avoided.

Additionally, the outer surface or rim of the blisk disc portion typically forms the inner annulus for working fluid in the gas turbine engine, such as at the compressor inlet. Thus the requirement for the inner annulus position fixes the blisk outer rim radius from the engine centre line thereby determining the basic size/shape of the disc portion. Accordingly, it may not be possible to design a blisk that avoids all forced vibration responses within such constraints.

OBJECTS AND SUMMARY

Accordingly, it is desirable to be able to provide efficient and/or effective damping to a rotor stage, for example to a bladed disc, or blisk.

According to an aspect, there is provided a rotor stage of a gas turbine engine comprising a plurality of blades extending from a generally circumferentially extending platform. A circumferentially extending damper ring that has a continuous circumferential load path is provided on the platform. The damper ring has an engagement surface that engages with the platform. The damper ring is in compression or tension, such that the engagement surface applies a predetermined pre-load to the platform. The damper ring may be described as being pre-set in compression or tension, for example the damper ring may be described as being in compression and/or tension even when the rotor stage is not in operation.

According to an aspect, there is provided a method of assembling a rotor stage of a gas turbine engine. The method comprises providing a plurality of blades extending from a generally circumferentially extending platform. The method comprises providing a circumferentially extending damper ring that has a continuous circumferential load path on the platform, such that an engagement surface of the damper ring engages with the platform. The method comprises applying compression or tension to the damper ring, such that the engagement surface applies a predetermined pre-load to the platform. The compression or tension may be provided by any suitable mechanism, such as those described by way of example herein, including through the use of an adjuster and/or through an interference fit to the platform.

The rotor stage may comprise a disc. The plurality of blades may be said to be mounted to the disc.

The arrangements and/or methods provided herein may result in improved damping. For example, damping may be provided through slip at the interface between the engagement surface and the platform. Such slip may be the result of vibrations in the rotor stage, which may be in the form of travelling waves. This slip may be optimised for improved damping by altering the load applied to the platform. Purely by way of example, below the optimal load the platform and engagement surface may have too little friction between them to provide optimal damping and/or may tend to separate during vibration. Also purely by way of example, above the optimal load the platform and the engagement surface may have too much friction between them, which may mean that they tend to stick together rather than slip, resulting in sub-optimal damping.

The pre-load applied by the engagement surface of the damper ring may be in a direction that is normal to the surface (or local surface) of the platform with which it engages. The pre-load may be generated by hoop stress in the damper ring, which may be predetermined hoop stress. The compression or tension in the damper ring may be referred to (for example collectively) as hoop stress or circumferential load/stress.

The circumferentially extending damper ring that has a continuous circumferential load path may be a continuous circumferentially extending damper ring. This may mean that there is a continuous circumferential path around the damper ring. However, the continuous circumferential path may or may not have continuous properties around the circumference, for example in terms of shape and/or material and/or properties. For example, a damper ring comprising a split ring with first and second ends and an adjuster (such as those comprising a screw, resilient member, spring, and/or wedges) between the first and second ends is an example of a circumferentially extending damper ring that has a continuous circumferential load path (and indeed of a continuous circumferentially extending damper ring).

Accordingly, the damper ring may be provided in the form of a split ring having a first end and a second end, with an adjuster connecting the first end to the second end. The adjuster may be adjustable to provide a circumferential load to the first and second ends of the split ring. The circumferential load may either be in a direction that pushes the first and second ends of the split ring away from each other, or in a direction that pulls the first and second ends of the split ring towards each other. The circumferential load may result in compressive stress or tensile stress in the split ring. In such an arrangement, the engagement surface may be a part of the split ring.

An adjuster may take any suitable form. For example, an adjuster may comprise a resilient member, such as a spring.

An adjuster may comprise a screw thread. Such an adjuster may comprise at least one adjusting nut that may be moveable along the screw thread (for example by screwing the nut on the thread) in order to adjust the pre-load applied to the platform.

An adjuster may comprise a wedge. Such an adjuster may be referred to as a wedge adjuster, and may have at least two wedges that can be slid past each other so as to adjust the pre-load applied to the platform. In such an arrangement, the wedge adjuster may have a width in the circumferential direction, and the width may be changed (and/or the circumferential load increased) by sliding the wedge faces of at least two wedges past each other.

The damper ring may comprise a continuous hoop of the same material. The compression may be provided through an interference fit. Such a continuous hoop of the same material may be continuous in that it is a single continuous ring with no end points.

Alternatively, the continuous hoop may be a part of a spiral damper having first and second ends and extending around at least one full circumference. Such a spiral damper may be considered to have a continuous circumferential load path because it extends around at least one full circumference.

In any arrangement, the pre-load applied by the damper ring to the platform (which may be referred to as the contact pressure) may be any suitable load, for example as required by the particular application. For example, the pre-load may be in the range of from 0.5 MPa to 100 MPa, for example 1 MPa to 50 MPa, for example 1.5 MPa to 30 MPa, for example 2 MPa to 20 MPa, for example 3 MPa to 15 MPa, for example 5 MPa to 10 MPa, for example on the order of 7.5 MPa. However, it will be appreciated that these values are provided by way of example only, and that the pre-load may be higher than 100 MPa or lower than 0.5 MPa (for example the pre-load may be higher if the contact area is lower and vice versa).

The engagement surface of the damper ring may engage a radially inner surface of the platform. In such an arrangement, the damper ring may be in compression. Thus, the hoop stress in the damper ring may be compressive, for example at least when the gas turbine engine is at rest.

The engagement surface of the damper ring may engage a radially outer surface of the platform. In such an arrangement, the damper ring may be in tension. Thus, the hoop stress in the damper ring may be tensile, for example at least when the gas turbine engine is at rest.

The engagement surface may, for example, form a cylinder, or a frusto-conical shape.

The disc may be of any suitable form, for example it may be a solid disc or an annular ring.

Any suitable shape may be used for the damper ring, for example for the cross-sectional shape of the damping ring.

The damper ring may have a generally annular shape.

The damper ring may be manufactured using any suitable material. For example, the damper ring may be manufactured using a single material and/or may be said to be homogeneous. The damper ring may comprise two (or more than two) different materials.

The damper ring may have a body portion and an engagement portion. The engagement portion may comprise the engagement surface that is in contact with the platform. Regardless of the material of the damper ring (for example whether it is manufactured using one, two, or more than two materials), the engagement surface may be a surface that slips relative to the platform during excitation (or vibration) of the platform. In arrangements in which the damper ring comprises a body portion and an engagement portion, the engagement portion may be manufactured using a first material, and the body portion may be manufactured using a second material. In such an arrangement, and purely by way of example only, the first material may be metal and/or the second material may be a composite, such as a fibre reinforced and/or polymer matrix composite, such as carbon fibre. In such an arrangement, the body portion and the engagement portion may, for example, be bonded together.

The platform may be provided with a slot. The damper ring may be retained by such a slot. The damper ring may be said to sit in and/or be located by and/or at least partly located in such a slot. Such a slot may be said to engage with the radially outer extent (for example radially outer surface) of the damper ring, where the damper ring is provided to a radially inner surface of the platform.

Where a slot is provided, the slot may take any suitable or desired shape. For example, the slot may be defined by a base and a sidewall. In such an arrangement, the angle between the base and the sidewall may be 90 degrees or greater, for example in the range of from 90 degrees to 170 degrees, for example 110 degrees to 140 degrees, for example on the order of 125 degrees. The slot may be in the form of three non-parallel sides of a trapezium/trapezoid.

The shape of the slot may correspond to the shape of the damper ring, for example to the part of the cross-section of the damper ring that sits in the slot. The damper ring may comprise side surfaces that engage with the sidewalls of the slot.

In any arrangement, a lubricant, such as a dry film lubricant, may be provided between the engagement surface of the damper and the platform. Such a lubricant may assist in providing a particularly consistent coefficient of friction at the engagement surface, for example during use and/or over time.

Any suitable shape may be used for the damper ring, for example for the cross-sectional shape of the damping ring. For example, the damper ring may have a cross-sectional shape perpendicular to the circumferential direction that has a depth in the radial direction, and a neutral bending axis that is spaced from the engagement surface by more than half of the depth. In such an arrangement, if the damper ring is provided on the radially inner surface of the platform, the damper ring may have a neutral bending axis that is closer to its radially inner extent than to its radially outer extent. Alternatively, if the damper ring is provided on the radially outer surface of the platform, the damper ring may have a neutral bending axis that is closer to its radially outer extent than to its radially inner extent.

Providing the neutral axis of the damper ring further from the engagement surface of the damper ring may provide greater slip (which may be referred to as the relative movement) at the interface between the damper ring and the platform that results from a traveling wave passing around the rotor stage (for example around the platform). This increased slip may lead to increased frictional energy being dissipated at the interface between the damper ring and the platform. This increased energy dissipation may lead to improved damping.

Purely by way of non-limitative example, the cross-sectional shape of the damper ring may be a T-shape, for example with the base of the T (where the base is the horizontal part of the "T" as presented on this page) provided at an opposite side to the engagement surface (for example an inverted T-shape, with the base of the T-shape provided at a radially inner extent, for arrangements in which the damper ring is provided to a radially inner surface of the platform).

The cross-sectional shape of the damper ring may comprise a portion that widens with increasing distance from the engagement surface (for example with decreasing radial distance for arrangements in which the damper ring is provided to the radially inner platform). For example, a majority portion of the damper ring may widen with increasing distance from the engagement surface.

By way of further non-limitative example, the cross-sectional shape of the damper ring may comprise a trapezium.

However, it will be appreciated that any cross-sectional shape may be used for damper rings according to the present disclosure, including those that have a neutral bending axis that is spaced from the engagement surface by more than half of the depth and those that do not have a neutral bending axis that is spaced from the engagement surface by more than half of the depth. For example, the cross-sectional shape may have a neutral bending axis that is spaced from the engagement surface by half of the depth, such as a rectangle.

According to an aspect, there is provided a method of designing a damper ring for a rotor stage of a gas turbine engine. The method comprises providing a test apparatus having a platform and the same vibration response properties to the rotor stage, for example such that the platform has the same vibration response properties as the platform of the rotor stage for which the damper ring is being designed. The method comprises providing a continuous circumferentially extending damper ring to the platform. The damper ring comprises an engagement surface that engages with the platform. The damper comprises an adjuster that is adjustable to change the load applied by the engagement surface to the platform. The method further comprises measuring the vibration response of the test apparatus with different loads applied to the platform from the engagement surface; and determining the load applied to the platform from the engagement surface that results in the optimum vibration response of the test apparatus.

The test apparatus may be the actual rotor stage (or a version thereof) for which the damper ring is being designed. Any compatible feature described and/or claimed herein may be used with the method of designing. Purely by way of example, the adjuster may comprise a thread and/or a resilient member, such as a screw.

According to an aspect, there is provided a method of manufacturing a damper ring for a rotor stage of a gas turbine engine. According to this aspect, the method comprises performing the method of designing the damper ring as described and/or claimed herein in order to determine the load to be provided by the engagement surface to the platform that results in the optimum vibration response. The method comprises forming the damper ring with the required mechanical properties and/or size required to provide the determined load when the damper ring is provided to the rotor stage of the gas turbine engine.

According to an aspect, there is provided a method of damping vibrations in a rotor stage of a gas turbine engine, wherein, the rotor stage is as described and/or claimed herein. The vibration comprises a travelling wave passing circumferentially around the circumferentially extending platform. The damping is frictional damping generated through slip between the engagement surface of the circumferentially extending damper ring and the platform caused by the travelling wave.

In any aspect and/or arrangements, the rotor stage may be a blisk. The plurality of blades may be provided integrally with the disc as a unitary part. In arrangements in which the rotor stage is a blisk, the circumferentially extending platform may be a blisk rim.

Any feature described and/or claimed herein, for example in relation to any one of the above features, may be applied/used singly or in combination with any other feature described and/or claimed herein, except where mutually exclusive.

BRIEF DESCRIPTION OF THE DRAWINGS

Examples will now be described by way of example only, with reference to the Figures, in which:

FIG. 9 is a schematic cross-sectional view of a part of a rotor stage including a damper ring in accordance with an example of the present disclosure; and FIG. 10 is a schematic perspective view of the damper ring of FIG. 9.

DETAILED DESCRIPTION OF EMBODIMENTS

Figure 1:
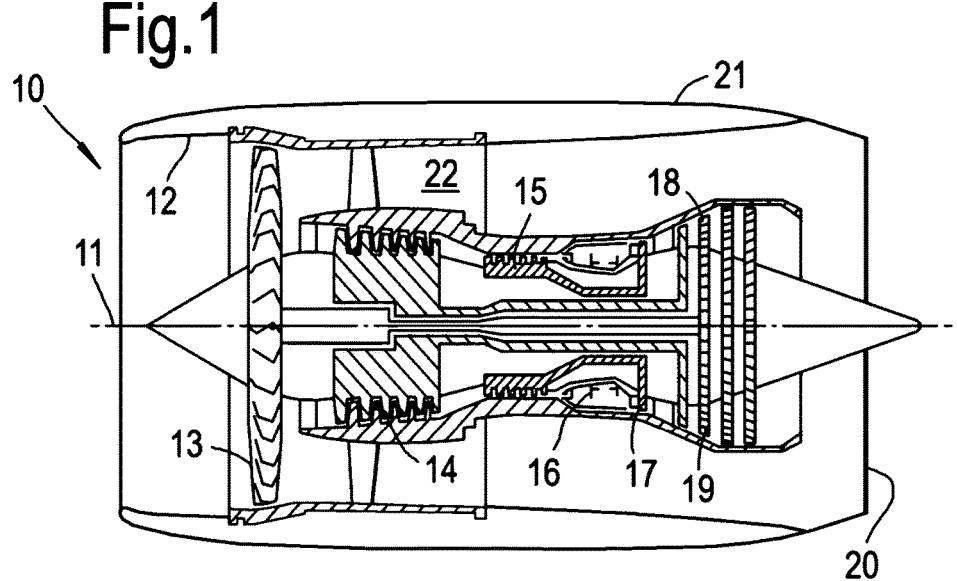
FIG. 1 is a sectional side view of a gas turbine engine in accordance with an example of the present disclosure.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Each of the high 17, intermediate 18 and low 19 pressure turbines and each of the fan 13, intermediate pressure compressor 14 and high pressure compressor 15 comprises at least one rotor stage having multiple blades (or aerofoils) that rotate in use. One or more rotor stage may be, for example, a disc with slots (which may be referred to as dovetail slots or fir-tree slots) for receiving the blade roots. One or more rotor stages may have the blades formed integrally with the supporting disc or ring structure, and may be referred to as blisks or blings. In such arrangements, the blades may be permanently attached to the supporting disc/ring, for example using friction welding, such as linear friction welding. Such arrangements may be referred to collectively herein as blisks.

Figure 2:
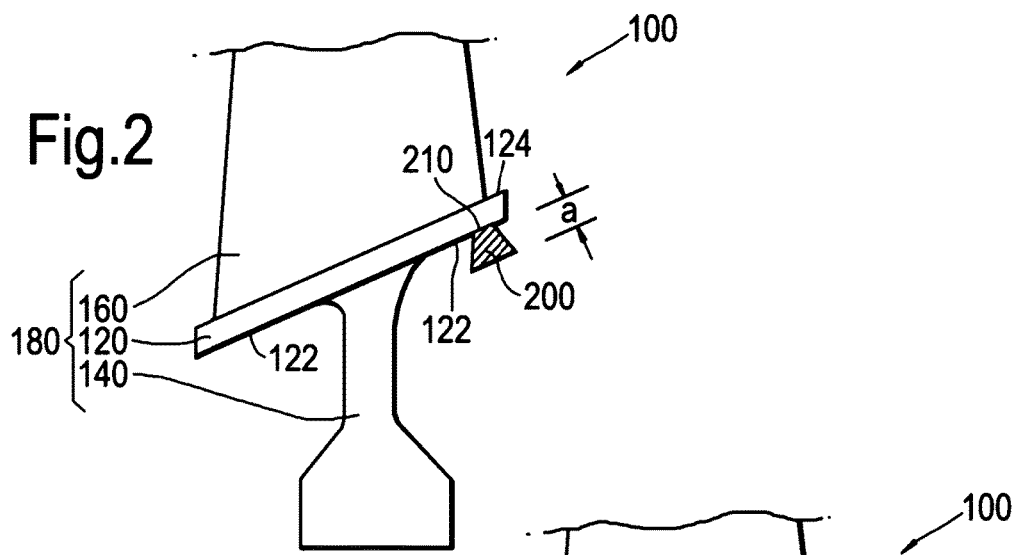
FIG. 2 is a schematic view of a part of a rotor stage of a gas turbine engine, including a damper ring, in accordance with an example of the present disclosure.

FIG. 2 shows a schematic side view of a part of a rotor stage 100, including a platform 120, a disc 140, a blade 160, and a damper ring 200. The platform 120, disc 140 and blade 160 may all be integral, and may be referred to collectively as a blisk 180. The rotor stage 100 may be any one of the rotor stages of the gas turbine engine 10 shown in FIG. 1, such as (by way of non-limitative example) the fan 13 and/or any one or more stages of one or more of the high 17, intermediate 18 and low 19 pressure turbines and/or the high pressure compressor 15 or intermediate pressure compressor 14.

Figure 2A:
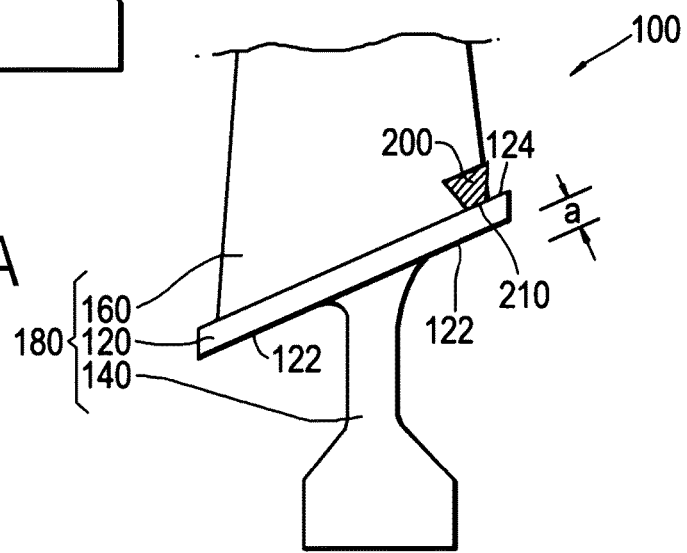
FIG. 2A is another schematic view of a part of a rotor stage of a gas turbine engine, including a damper ring, in accordance with an example of the present disclosure.

In the FIG. 2 example, the damper ring 200 is provided to the lower (or radially inner) surface 122 of the platform 120. In other arrangements the damper ring 200 may engage with another part of the platform 120 such as, by way of example, an upper (or radially outer) surface 124 of the platform 120 as illustrated by FIG. 2A.

The damper ring 200 has an engagement surface 210 that engages with the platform 120. The engagement surface 210 may be at a radially outer extent (and/or may be said to be and/or define the radially outer surface of the damper ring 120), as in the FIG. 2 arrangement. The engagement surface 210 of any arrangement may be said to extend circumferentially and/or may be at least a part of a cylinder or frusto-cone.

The damper ring 200 is shown in cross-section normal to the circumferential direction in FIG. 2. The cross-section of the damper ring 200 normal to the circumferential direction may be any shape. In the example shown in FIG. 2, the cross-sectional shape of the damper ring 200 is such that its neutral bending axis is spaced from the engagement surface 210 by more than half of the depth of the damper ring, this depth being indicated by reference 'a' in the FIG. 2 example. However, other damper rings may have cross-sectional shapes that do not have their neutral bending axis spaced from the engagement surface 210 by more than half of the depth. The cross-sectional shape of the damper ring 200 shown in FIG. 2 may be described as a trapezium, or trapezoid. The narrower side of the trapezium is at the engagement surface 210 (at a radially outer extent in the FIG. 2 example). The wider side of the trapezium is opposite to the engagement surface 210 (at a radially inner extent in the FIG. 2 example).

Figure 3:
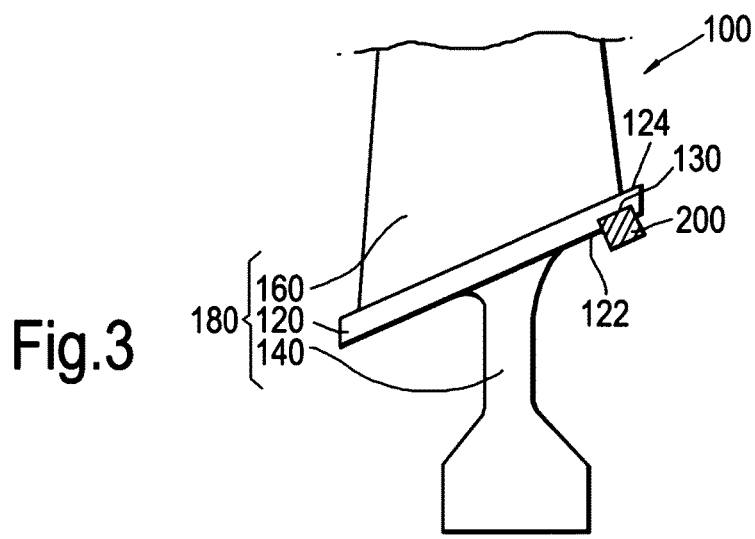
FIG. 3 is a schematic view of a part of a rotor stage of a gas turbine engine, including a damper ring, in accordance with an example of the present disclosure.

The example shown in FIG. 3 is similar to that shown in, and described in relation to, FIG. 2. Like features in FIGS. 2 and 3 are indicated with like reference numerals. Unlike the FIG. 2 arrangement, the FIG. 3 arrangement has a slot 130 provided in the platform 120. The damper ring 200 is provided (and/or located and/or secured) in the slot 130. The slot 130 may be said to receive the damper ring 200. The slot 130 may be said to extend circumferentially.

In the FIG. 3 arrangement the slot 130 is provided to the radially inner surface 122 of the platform 120, although in other arrangements the slot 130 may be provided to another part of the platform 120, such as the radially outer surface 124 of the platform 120. The cross-sectional shape (perpendicular to the circumferential direction) of the slot 130 corresponds to the cross-sectional shape of a portion of the damper ring 200 that is adjacent the engagement surface 210. In the FIG. 3 arrangement this corresponds to a radially outer portion of the damper ring 200.

In the FIG. 3 arrangement, the cross-sectional shape of the damper ring 200 is rectangular. Any damper ring 200 according to the present disclosure may have such a rectangular (or square) cross-section (or indeed any other shape), for example regardless of whether or not it is provided in a slot 130.

Any of the damper rings 200 described and/or claimed herein may function through frictional damping. Such frictional damping occurs as a result of relative movement at the interface between the damper ring 200 and the surface with which it is engaged. For example, the relative movement may be between the engagement surface 210 of the damper ring 200 and the surface of the platform 120 (for example the radially inner 122 or radially outer 124 surface) with which it is engaged. This relative movement and frictional damping mechanism is described in greater detail in relation to FIGS. 4 and 5.

Figure 4:
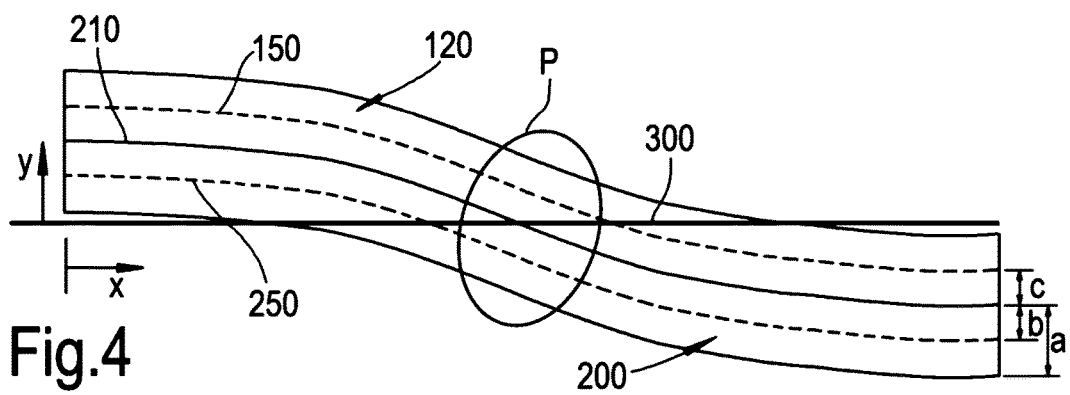
FIG. 4 is a schematic showing slip at an interface between a damper ring and a platform.

FIG. 4 shows a schematic of part of a platform 120 and damper ring 200 in a deformed state, for example due to vibration. The engagement surface 210 is shown in the deformed state in FIG. 4, and the line 300 in FIG. 4 represents the original, undeformed, interface between the platform 120 and the damper ring 200.

The FIG. 4 view is a purely schematic representation perpendicular to the rotational axis 11 of the rotor stage 100. The view may be described as being in the radial-circumferential plane. Thus, although the undeformed interface (or engagement surface) 300 is shown as a straight line in FIG. 4 for ease of representation and explanation, it will be appreciated that the actual undeformed interface would be at least a segment of a circle. Accordingly, the deflection y represents the deflection from the original circular shape, and the dimension x represents the distance around the circumference of the interface.

Figure 5:
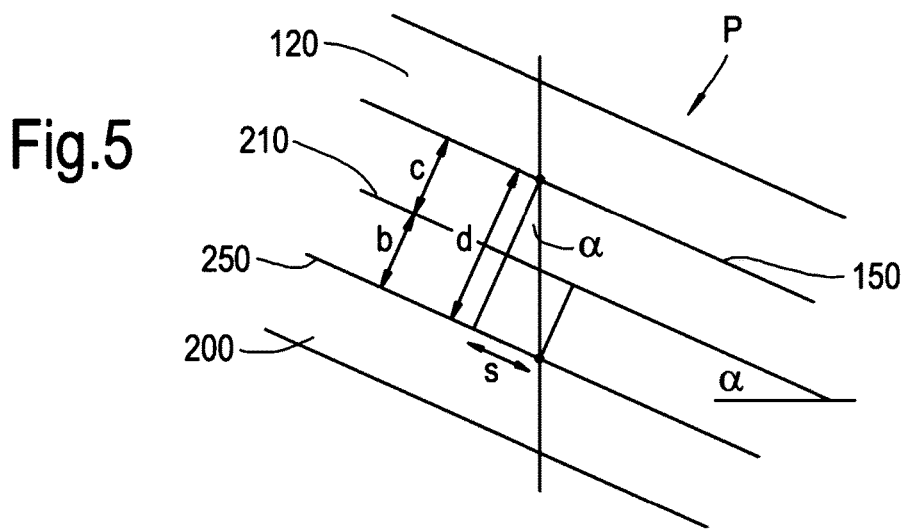
FIG. 5 is a close-up view of a part of the FIG. 4 schematic.

FIG. 5 shows a close up version of the region labelled "P" in FIG. 4. This region P is the region of maximum slip at the interface between the platform 120 and the damper ring 200, i.e. maximum slip at the engagement surface 210.

The neutral bending axis of the damper ring 200 is shown in FIGS. 4 and 5 by dashed line 250, and the neutral bending axis of the platform 120 is shown by dashed line 150. The neutral bending axis 150, 250 shown in the figures may be part of a neutral bending surface for the respective component. The neutral bending axis/surface 150, 250 of a component 120, 200 may be defined as the axis/surface that does not experience any stress and/or strain (for example in the circumferential direction) as the component deforms, for example due to vibration. The shear stress/strain may be said to be at maximum on the neutral axis/surface. The position of these neutral bending axes is shown purely schematically in FIGS. 4 and 5, for the purpose of explaining the frictional damping mechanism.

The thickness, or depth, of the damper ring 200 is shown by reference a. The distance of the neutral bending axis 250 of the damper ring 200 from the engagement surface 210 is labelled b in FIGS. 4 and 5. The distance of the neutral bending axis 150 of the platform 120 from the engagement surface 210 is labelled c in FIGS. 4 and 5.

Frictional damping may occur due to relative movement between the damper ring 200 and the platform 120 at the engagement surface 210. In other words, as the platform 120 and the damper ring 200 vibrate, the deflection y at a given position x around the circumference changes, and may be said to oscillate about the centreline, or undeformed line, 300. This oscillation leads to varying relative sip at the interface 210, and thus the generation of frictional energy that acts to damp the vibration.

FIG. 4 represents half of a wavelength of a sinusoidal vibration. If the radius of the undeformed interface 300 is given by R, and the total number of waves (or "nodal diameters") around the circumference is given by N, then it follows that the deflection of the engagement surface 210 at a given location x around the circumference is given by:

$$y = Y\cos\left(N\frac{x}{R}\right)$$

where Y is the maximum deflection.

Differentiating this to find the slope gives:

$$\frac{dy}{dx} = -\frac{NY}{R}\sin\left(\frac{Nx}{R}\right) = \tan(\alpha)$$

where α is the angle from the undeformed shape.

This has a maximum magnitude at (for example) x=πR/2N of:

$$\tan(\alpha) = \frac{NY}{R}$$

This value is in the region P shown in detail in FIG. 5, from which it is clear that:

$$\tan(\alpha) = \frac{s}{d} \Rightarrow \frac{s}{d} = \frac{NY}{R} \Rightarrow \boxed{s = \frac{NYd}{R}}$$

where s is the maximum slip, and d is the separation between the neutral axes 150, 250 of the platform 120 and damper ring 200.

Accordingly, it is clear that the maximum slip value is a function of (in this model proportional to) the separation d between the neutral axes 150, 250 of the platform 120 and the damper ring 200. Because it is the slip s that generates the friction to dissipate the energy that in turn provides the damping, it may be advantageous to maximise (or increase) this value. This may be achieved by increasing the value of d, i.e. increasing the separation between the neutral axes 150, 250 of the platform 120 and the damper ring 200, for example by increasing the distance b of the neutral axis 250 of the damper ring 200 from the engagement surface 210.

However, regardless of the cross-sectional shape of the damper ring 200 (and thus regardless of the distance b of the neutral axis 250 of the damper ring 200 from the engagement surface 210), another factor that may influence the damping properties (for example the level or magnitude of the damping) provided by the damper ring 200 is the normal load (or contact stress) between the platform 120 and the damper ring 200. Such normal load may be said to act in a radial direction (relative to the engine axis). Thus, in any arrangement, the pre-load applied by the engagement surface to the platform may be described as a radial pre-load. In use, a working normal load may be provided by the damper ring 200 due to centrifugal loading as the rotor stage 100 rotates. This normal load may typically be a function of the mass of the damper ring 200. However, aspects of the present disclosure realize that by providing a pre-load to the damper ring 200 (such that, for example, the damper ring 200 provides a predetermined normal load to the platform 120 even without any centrifugal loading effects), the damping properties can be improved and/or optimized. Such improvement/optimization of the damping properties can be realized without the need to increase the mass of the damper ring 200, thereby avoiding the associated resulting performance penalties.

Figure 6:
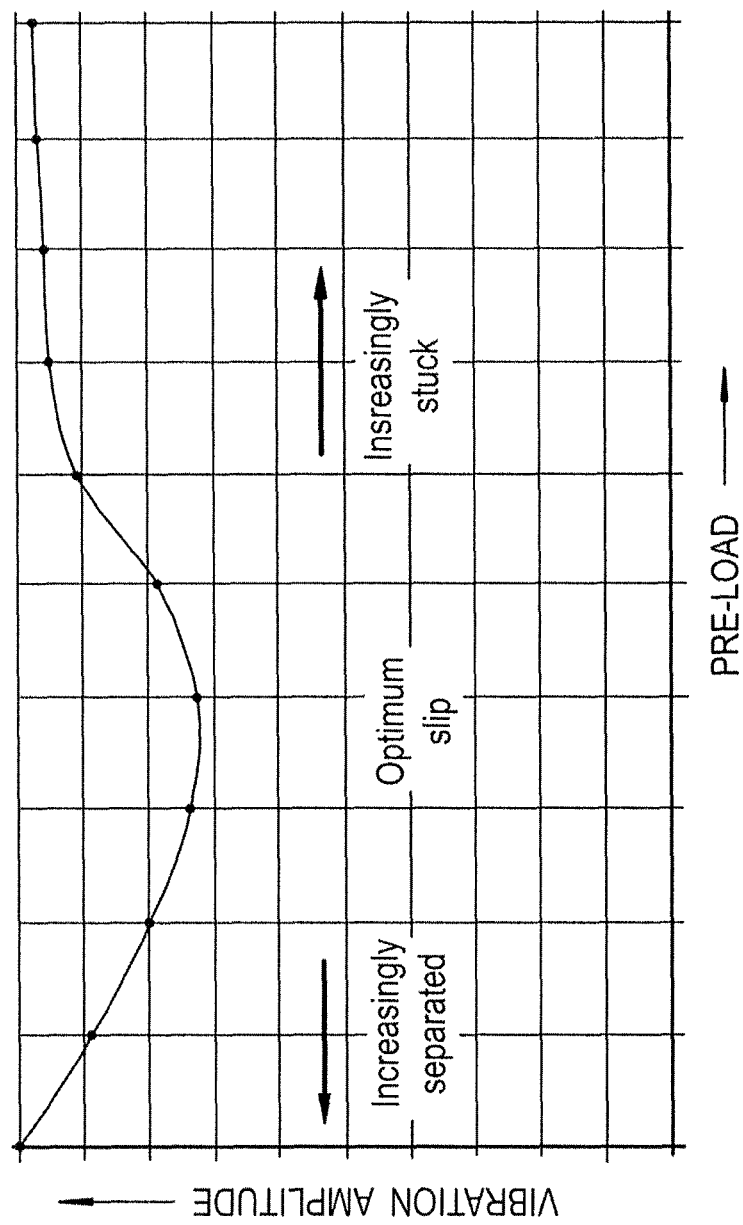
FIG. 6 is a graph showing the predicted amplitude of vibration against the normal contact stress, or load, applied to a rotor stage by a damper ring.

The effect of providing pre-load (or contact stress) on damping properties is illustrated by way of example in FIG. 6. Specifically, FIG. 6 shows how vibration amplitude (y-axis, increasing up the page) varies with pre-load (x-axis, increasing to the right of the page) for a particular arrangement of rotor stage 100, such as a rotor stage 100 described and/or claimed herein. The vibration amplitude may be the vibration amplitude of the platform 120 of the rotor stage 100.

As shown in FIG. 6, there is an optimum pre-load (or normal/radial stress) at which the vibration amplitude is a minimum. This minimum vibration amplitude may be attributed to optimal damping provided by the damper ring 200. The optimum pre-load may be the point at which there is optimum slip between the damping ring 200 and the platform 120.

If the pre-load is below the optimum pre-load, the vibration amplitude rises. This may be because there is insufficient load between the vibration damper 200 and the platform 120 to provide optimum frictional energy dissipation. As indicated in FIG. 6, as the pre-load decreases away from the optimum, the damper ring 200 and the platform 120 may become increasingly separated, thereby losing frictional damping efficiency.

If the pre-load is above the optimum pre-load, the vibration amplitude rises. This may be because the load between the vibration damper 200 and the platform 120 is too high to allow the necessary slip between the engagement surfaces to provide the optimum frictional energy dissipation. As indicated in FIG. 6, as the pre-load increase away from the optimum, the damper ring 200 and the platform 120 may become increasingly stuck, thereby decreasing slip at the engagement surfaces and losing frictional damping efficiency.

Accordingly, aspects of the present disclosure provide a damper ring 200 which provides a pre-load to the platform 120. The pre-load may be set to a level to provide optimal damping to the rotor stage 100. The damping may, for example, be optimized over a range of excitation frequencies and/or for one or more particular excitation frequencies which may, for example, represent natural vibration frequencies of the rotor stage 100.

The predetermined pre-load may be determined in any appropriate manner, for example through experiment and/or through computer modelling. Such experiment and/or computer modelling may involve performing simulations and/or vibration tests at different pre-loads, and optionally at different frequencies. Such experiments may be performed on a test rig. Such a test rig may be a version of the rotor stage 100 for which the damper ring 200 is being designed.

Figure 7:
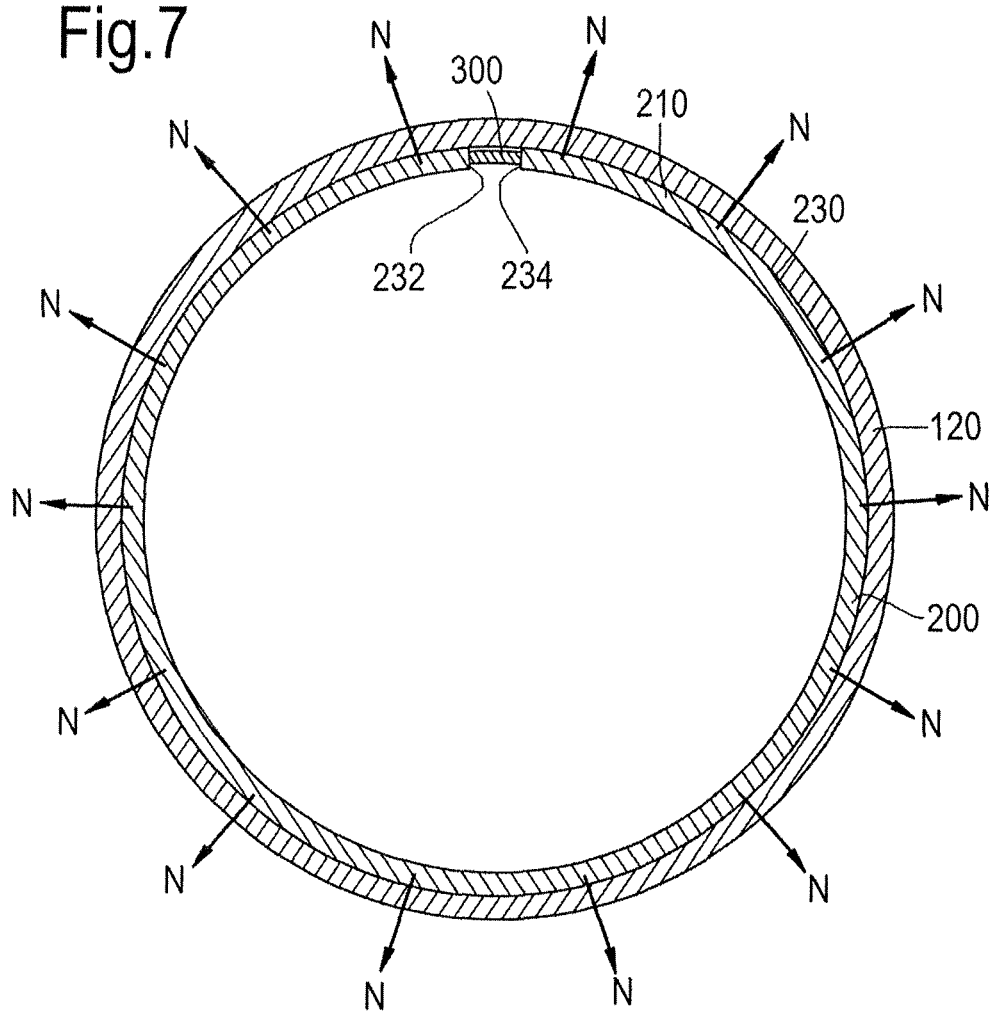
FIG. 7 is a schematic cross-sectional view perpendicular to an engine axis showing a damper ring in accordance with an example of the present disclosure.

The damper ring 200 may be arranged to provide the pre-load in any suitable manner. Purely by way of example, FIG. 7 shows a damper ring 200 that has an adjuster 300. The adjuster 300 allows the circumferential (or hoop) stress in the damper ring 200 to be altered, thereby altering the normal stress (or pre-load) N provided to the platform 120 via the engagement surface 210.

In the FIG. 7 example, the damper ring 200 is provided in the form of a split ring 230 having a first end 232 and a second end 234 and the adjuster 300. The adjuster 300 is provided between the first end 232 and the second end 234. The damper ring 200 shown in FIG. 7 has a circumferentially continuous load path that extends through the split ring 230 and adjuster 300. The damper ring 200 may be described as being circumferentially continuous.

Figure 8:
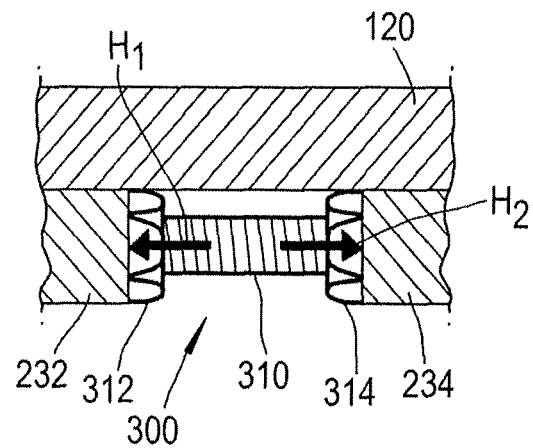
FIG. 8 is a schematic view of an adjuster that may be provided to a damper ring according to an example of the present disclosure.

FIG. 8 is an enlarged view of the adjuster 300. The adjuster 300 has a threaded portion 310. The adjuster 300 has a first nut 312 and a second nut 314. The first nut 312 is provided at a first end of the adjuster 300 that engages with the first end 232 of the split ring 230. The second nut 314 is provided at a second end of the adjuster 300 that engages with the second end 234 of the split ring 230. The hoop stress in the damper ring 200 may be adjusted by moving one or more nuts 312, 314 in a substantially circumferential direction. For example, moving one of the nuts 312, 314 in a direction that is away from the other nut 312, 314 (more generally away from the opposite, or distal, end of the thread 310) may increase the compressive hoop stress in an arrangement in which the damper ring 200 is provided to the radially inner surface of the platform 120, as in the FIGS. 7 and 8 example. Moving the nut(s) 312, 314 in the same direction in an arrangement in which the damper ring 200 is provided to a radially outer surface of the platform 120 may result in a reduction in a tensile pre-load. The circumferential (or hoop) stress provided to the damper ring 200 by the adjuster 300 is indicated by the symbols $H_1$ and $H_2$.

In the example shown in FIG. 7, the damper ring 200 is provided to the radially inner surface of the platform 120. In such an arrangement, the normal preload N is provided to the platform 120 through compressive hoop stress $H_1$, $H_2$ in the damper ring 200. Other arrangements (which may be otherwise the same or similar) may have the damper ring 200 provided to a radially outer surface of the platform 120. In such arrangements, the normal preload N (which may be described as being radially inwards) is provided to the platform 120 through tensile hoop stress in the damper ring 200.

As explained above, the adjuster 300 shown in the example of FIGS. 7 and 8 comprises a threaded portion 310. However, alternative arrangements of adjuster may be used with any arrangement that is in accordance with the present disclosure. For example the adjuster 300 may comprise one or more wedges and/or one or more magnets (including electromagnets). In any arrangement, the adjuster may be adjustable in order to change the normal load N provided to the rotor stage 100, for example to the platform thereof. The change in normal load N may be produced by a change in circumferential stress in the damper ring 200 generated by adjusting the adjuster 300.

Some arrangements in accordance with the present disclosure may not comprise a separate adjuster. According to such arrangements, the damper ring 200 may be a continuous circumferential hoop. Such a continuous circumferential hoop may be formed of the same material around the circumference and/or may have the same cross-section around the circumference. The normal load (pre-load) N may be generated in such arrangements through tension or compression in the circumferential hoop due to an interference fit on the rotor stage, for example on the platform 120. Such an interference fit may be produced in any suitable manner, such as through a relative temperature difference between the damper ring 200 and the platform 120 during assembly.

FIGS. 9 and 10 show an alternative arrangement of damper ring, labelled 400 in FIGS. 9 and 10 but performing the function of the damper rings labelled 200 elsewhere herein. The damper ring 400 of FIGS. 9 and 10 may be described as a spiral damper ring 400. The spiral damper ring 400 may extend around at least one full circumference, from a first end 412 to a second end 414. The spiral damper ring 400 may provide the normal load N through spring action.

In any arrangement of the present disclosure, the pre-load (or normal load) N may, for example, act radially inwardly (for example in the damper ring 200 is located on a radially outer surface of the platform 120) or radially outwardly (for example if the damper ring 200 is placed on a radially inner surface of the platform 120, as illustrated by way of example in FIG. 7).

It will be understood that the invention is not limited to the arrangements and/or examples above-described and various modifications and improvements can be made without departing from the concepts described and/or claimed herein. Except where mutually exclusive, any of the features may be employed separately or in combination with any other features and the disclosure extends to and includes all combinations and sub-combinations of one or more features described and/or claimed herein.

I claim:

1. A rotor stage of a gas turbine engine comprising
a plurality of blades extending from a circumferentially extending platform, wherein:
a circumferentially extending damper ring that has a continuous circumferential load path is provided on the platform, the damper ring having an engagement surface that engages with the platform;
the damper ring is in compression or tension, such that the engagement surface applies a pre-load to the platform; and
the damper ring is provided in the form of a split ring having a first end and a second end, with an adjuster connecting the first end to the second end, the adjuster being adjustable to provide a circumferential load to the first and second ends of the split ring.

2. The rotor stage according to claim 1, wherein the adjuster comprises a screw thread and at least one adjusting nut that is moveable along the screw thread in order to adjust the pre-load applied to the platform.

3. The rotor stage according to claim 1, wherein the engagement surface is a part of the split ring.

4. The rotor stage according to claim 1, wherein a contact pressure applied by the pre-loaded damper ring to the platform is in a range of 2 MPa to 100 MPa.

5. The rotor stage according to claim 1, wherein the engagement surface of the damper ring engages a radially inner surface of the platform, and the damper ring is in compression.

6. The rotor stage according to claim 1, wherein the engagement surface of the damper ring engages a radially outer surface of the platform, and the damper ring is in tension.

7. The rotor stage according to claim 1, wherein the platform is provided with a slot, and the damper ring is retained by the slot.

8. The rotor stage according to claim 7, wherein the slot has a cross-section defined by a base and two sidewalls, the angle between the base and the sidewall being greater than 90 degrees.

9. The rotor stage according to claim 7, wherein the slot has a cross-section defined by a base and two sidewalls, and the engagement surface of the damper ring comprises side surfaces that engage with the sidewalls of the slot.

10. The rotor stage according to claim 1, wherein:

the damper ring has a cross-sectional shape perpendicular to a circumferential direction of the damper ring that has a depth (a) in a radial direction of the damper ring, and a neutral bending axis that is spaced (b) from the engagement surface by more than half of the depth.

11. A method of damping vibrations in a rotor stage of a gas turbine engine, wherein:

the rotor stage is the rotor stage according to claim 1;

the vibrations comprise a travelling wave passing circumferentially around the circumferentially extending platform; and the damping is frictional damping generated through slip(s) between the engagement surface of the circumferentially extending damper ring and the platform caused by the travelling wave.

* * * * *